United States Patent
Davis et al.

(10) Patent No.: US 9,556,026 B1
(45) Date of Patent: Jan. 31, 2017

(54) HYDROGEN PRODUCTION PROCESS FOR COLD CLIMATES

(71) Applicant: AIR PRODUCTS AND CHEMICALS, INC., Allentown, PA (US)

(72) Inventors: Ruth Ann Davis, Allentown, PA (US); Tanya Mohan Siwatch, Jersey City, NJ (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 14/844,074

(22) Filed: Sep. 3, 2015

(51) Int. Cl.
*C01B 3/38* (2006.01)

(52) U.S. Cl.
CPC ......... *C01B 3/38* (2013.01); *C01B 2203/0233* (2013.01); *C01B 2203/0811* (2013.01); *C01B 2203/0883* (2013.01); *C01B 2203/1235* (2013.01)

(58) Field of Classification Search
CPC ............................................. C01B 2203/0883
See application file for complete search history.

(56) References Cited

U.S. PATENT DOCUMENTS

| | | | |
|---|---|---|---|
| 7,377,951 B2 | 5/2008 | Pham et al. | |
| 8,709,287 B2 * | 4/2014 | Peng .................. | C01B 3/384 252/373 |
| 8,920,771 B2 * | 12/2014 | Peng .................. | C01B 3/384 203/22 |
| 8,920,772 B2 * | 12/2014 | Peng .................. | C02F 1/16 203/10 |
| 8,956,587 B1 * | 2/2015 | Peng .................. | C01B 3/384 423/650 |
| 9,309,130 B2 * | 4/2016 | Peng .................. | C02F 1/16 |
| 2011/0146991 A1 * | 6/2011 | Palamara .......... | C01B 3/384 166/303 |
| 2011/0277962 A1 | 11/2011 | Von Trotha | |
| 2012/0294783 A1 * | 11/2012 | Palamara .......... | C01B 3/384 422/625 |
| 2013/0309163 A1 * | 11/2013 | Peng .................. | C01B 3/384 423/650 |
| 2014/0034479 A1 * | 2/2014 | Peng .................. | C01B 3/384 203/22 |
| 2014/0037510 A1 * | 2/2014 | Peng .................. | C02F 1/16 422/162 |
| 2014/0284199 A1 * | 9/2014 | Peng .................. | C01B 3/384 202/174 |
| 2015/0110708 A1 * | 4/2015 | Peng .................. | C02F 1/16 423/580.1 |

FOREIGN PATENT DOCUMENTS

| | | | |
|---|---|---|---|
| EP | 0320440 A2 | 6/1988 | |
| EP | 2103569 A2 | 9/2009 | |

* cited by examiner

*Primary Examiner* — Melvin C Mayes
*Assistant Examiner* — Kenneth Vaden
(74) *Attorney, Agent, or Firm* — Bryan C. Hoke, Jr.

(57) ABSTRACT

Process for producing a hydrogen-containing product gas suited for operating in regions where the ambient conditions are below freezing for extended periods of time during the winter and warm or hot during the summer months. Hot makeup water is provided to the process to avoid freezing. A portion of the hot makeup water stream is heated in a steam generator to make steam where the steam is used to heat incoming hydrocarbon feed for the process. Another portion of the hot makeup water stream may be heated by combustion product gases where the heated water stream is used to heat incoming combustion oxidant.

16 Claims, 1 Drawing Sheet

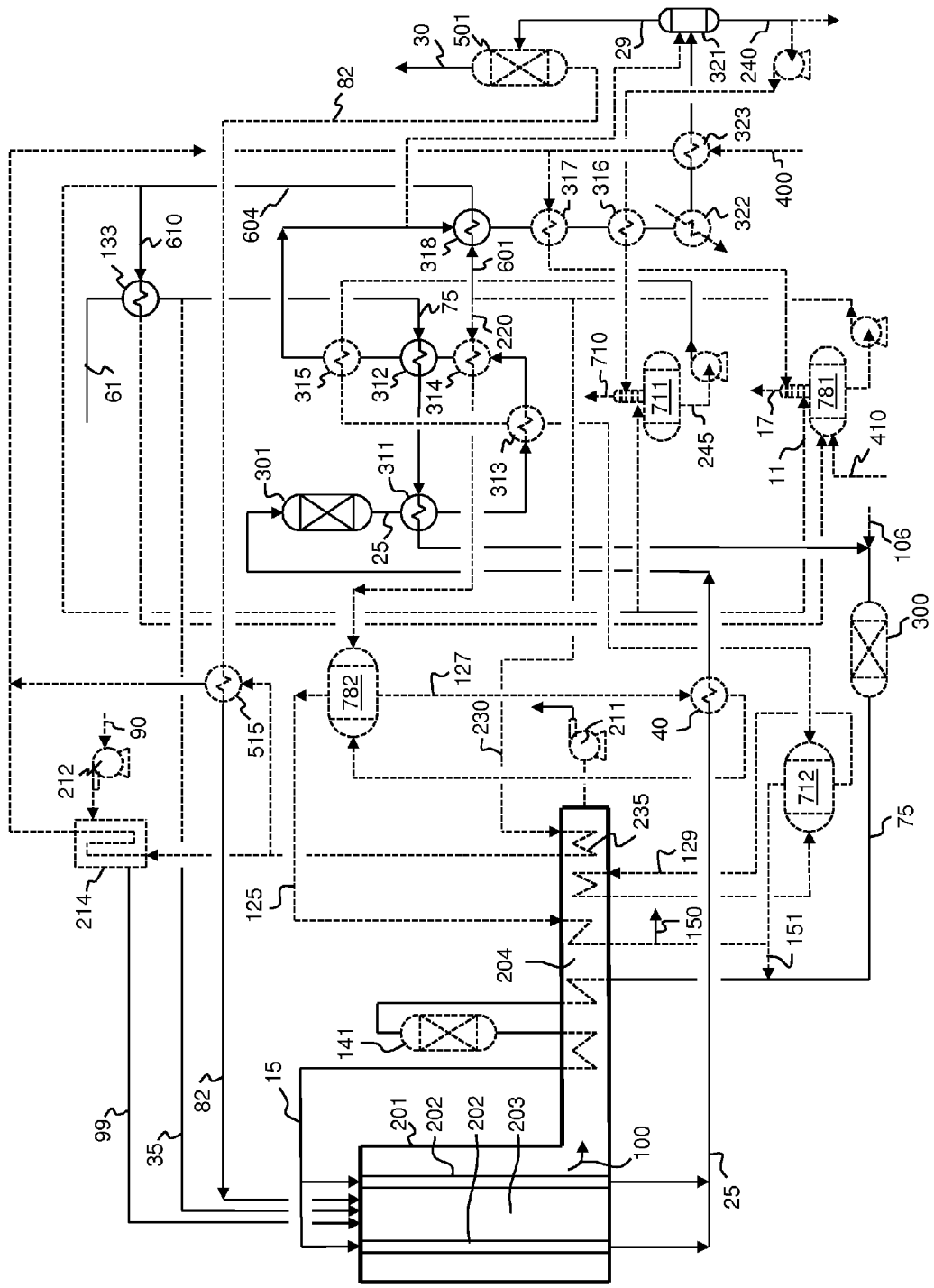

HYDROGEN PRODUCTION PROCESS FOR COLD CLIMATES

BACKGROUND

The operation of hydrogen production facilities in locations experiencing cold winters presents special challenges. During winter, these facilities can experience sustained ambient temperatures well below 0° C. and as low as −34° C., depending on location. In winter, one obvious problem is freezing of makeup water used for the steam system and utility water supplying cooling medium. During winter months, it may not be possible to use a water cooling tower. Another problem is the formation of solid hydrates and sulfur deposition in hydrocarbon streams.

To solve the problem of steam system makeup water freezing, hot makeup water may be provided to the hydrogen production facility. The use of hot makeup water then requires a change in the heat transfer network as compared to systems not receiving hot makeup water. Cold makeup water is conventionally used to cool the reformate and condense water from the reformate. Without cooling provided by cold makeup water, other means for cooling the reformate must be found.

Closed loop cooling water utility systems may not be provided in locations experiencing sustained cold winters due to cooling tower freezing problems during winter operation. Without the closed loop cooling water utility systems, forced draft air coolers are used to reject low level heat to the atmosphere. Due to the lack of other available coolants, the heat duty of the air coolers needs to be increased. These air coolers must be sized for the higher temperatures expected during the summer, where a lower temperature driving force is available, resulting in larger, more costly equipment.

It is apparent that designs optimized for temperate conditions where there is little chance of freezing may not be well-suited for cold climates and/or that the energy efficiency may be significantly deteriorated and/or the size/cost of required heat transfer equipment may be significantly increased.

Industry desires a cost-effective hydrogen production process that operates energy efficiently in both conditions of warm summers and cold winters.

Industry desires a hydrogen production process that avoids freezing of any process water streams.

Industry desires a hydrogen product process that avoids solid deposits in hydrocarbon streams due to hydrate formation and/or sulfur deposition.

Industry desires reduce the required size of forced draft air coolers to cool the reformate when cold makeup water is in short supply.

Related disclosures include U.S. Pat. No. 7,377,951B1 and U.S. 2011/0277962A1.

BRIEF SUMMARY

The present invention relates to a process for producing a hydrogen-containing product gas. The present process is particularly suited for operating in regions where the ambient conditions are below freezing for extended periods of time during the winter and warm or hot during the summer months.

There are several aspects of the invention as outlined below. In the following, specific aspects of the invention are outlined below. The reference numbers and expressions set in parentheses are referring to an example embodiment explained further below with reference to the FIGURE. The reference numbers and expressions are, however, only illustrative and do not limit the aspect to any specific component or feature of the example embodiment. The aspects can be formulated as claims in which the reference numbers and expressions set in parentheses are omitted or replaced by others as appropriate.

Aspect 1. A process for producing a hydrogen-containing product gas (30), the process comprising:

introducing a reformer feed gas mixture (15) comprising at least one hydrocarbon and steam into a plurality of catalyst-containing reformer tubes (202) in a reformer furnace 201, reacting the reformer feed gas mixture (15) in a reforming reaction under reaction conditions effective to form a reformate (25) comprising $H_2$, CO, $CH_4$, and $H_2O$, and withdrawing the reformate (25) from the plurality of catalyst-containing tubes (202);

combusting a fuel (82, 35) with an oxidant gas (99) in a combustion section (203) of the reformer furnace 201 external to the plurality of catalyst-containing reformer tubes (202) under conditions effective to combust the fuel (82, 35) to form a combustion product gas (100) and generate heat to supply energy for reacting the reformer feed gas mixture (15) inside the plurality of catalyst-containing reformer tubes (202), and withdrawing the combustion product gas (100) from the combustion section (203);

passing the reformate (25) from the plurality of catalyst-containing reformer tubes (202) to a shift reactor (301) and reacting the reformate (25) in the presence of a shift catalyst under reaction conditions sufficient to shift the reformate (25) to form additional $H_2$ in the reformate (25);

passing the reformate (25) from the shift reactor (301) to a steam generator (318) via a first plurality of heat exchangers (311, 312, 313, 314, 315), the first plurality of heat exchangers operatively connecting the shift reactor (301) to the steam generator (318), thereby cooling the reformate in the first plurality of heat exchangers;

heating a first water stream (601) by indirect heat transfer with the reformate (25) in the steam generator (318) to produce a (low pressure) steam stream (604) from the first water stream (601);

passing a first portion (610) or all of the steam stream (604) to a heat exchanger (133) for heating a hydrocarbon feed and heating a hydrocarbon feed (61) by indirect heat transfer with the first portion (610) or all of the steam stream (604);

forming the reformer feed gas mixture (15) from a reformer feed (75), wherein the reformer feed (75) comprises at least a portion of the hydrocarbon feed (61) that was heated in the heat exchanger (133) for heating the hydrocarbon feed;

passing the reformate (25) from the steam generator (318) to a condensate separator (321) via a second plurality of heat exchangers (316, 317, 322, 323), the second plurality of heat exchangers operatively connecting the steam generator (318) to the condensate separator (321), thereby condensing water in the reformate to form a water condensate (240) and a water-depleted reformate (29), and separating the water condensate (240) from the water-depleted reformate (29) in the condensate separator (321); and forming the hydrogen-containing product gas (30) from at least a portion of the water-depleted reformate (29).

Aspect 2. The process of aspect 1 further comprising:

dividing the hydrocarbon feed (61) after heating the hydrocarbon feed (61) in the heat exchanger (133) for heating the hydrocarbon feed to form the reformer feed (75) and a supplemental fuel (35), wherein the fuel (82, 35) comprises the supplemental fuel (35).

Aspect 3. The process of aspect 1 or aspect 2 further comprising:
passing a first portion of an imported water stream (410) to the steam generator (318) as at least a portion of the first water stream (601), the imported water stream having a temperature ranging from 60° C. to 120° C. or ranging from 80° C. to 120° C., wherein at least a portion of the imported water stream (410) bypasses any and all of the first plurality of heat exchangers operatively connecting the shift reactor (301) to the steam generator (318) and any and all of the second plurality of heat exchangers operatively connecting the steam generator (318) to the condensate separator (321) on its initial pass to the steam generator (318), where the first plurality of heat exchangers include each and every heat exchanger operatively connecting the shift reactor (301) to the steam generator (318), and where the second plurality of heat exchangers include each and every heat exchanger operatively connecting the steam generator (318) to the condensate separator (321).

Aspect 4. The process of aspect 3 wherein the first portion of the imported water stream (410) bypasses any and all of the first plurality of heat exchangers and any and all of the second plurality of heat exchangers on its initial pass to the steam generator (318).

Aspect 5. The process of aspect 3 or aspect 4 wherein the first portion of the imported water stream (410) passes to a deaerator (781) as part of the imported water stream (410) prior to the first portion of the imported water stream (410) being passed to the steam generator (318).

Aspect 6. The process of any one of aspects 3 to 5 further comprising:
passing a second water stream (230) comprising a second portion of the imported water stream (410) to a heat exchanger (235) for heating the second water stream (235), and heating the second water stream (230) by indirect heat transfer with the combustion product gas (100) in the heat exchanger (235) for heating the second water stream (230); and
passing a first portion or all of the second water stream (230) from the heat exchanger (235) for heating the second water stream (230) to a heat exchanger (214) for heating the oxidant gas (99), and heating the oxidant gas (99) by indirect heat transfer with the first portion or all of the second water stream (230) prior to the oxidant gas (99) being used to combust the fuel (82, 35).

Aspect 7. The process of any one of aspects 3 to 6 wherein the step of forming the hydrogen-containing product gas (30) from the water-depleted reformate (29) comprises separating a pressure swing adsorption unit feed comprising at least a portion of the water-depleted reformate gas (29) in a pressure swing adsorption unit (501) to form the hydrogen-containing product gas (30) and a pressure swing adsorption unit by-product gas (82), wherein the fuel (82, 35) is formed from at least a portion of the pressure swing adsorption unit by-product gas (82).

Aspect 8. The process of aspect 6 wherein the step of forming the hydrogen-containing product gas (30) from the water-depleted reformate (29) comprises separating a pressure swing adsorption unit feed comprising at least a portion of the water-depleted reformate gas (29) in a pressure swing adsorption unit (501) to form the hydrogen-containing product gas (30) and a pressure swing adsorption unit by-product gas (82), wherein the fuel (82, 35) is formed from at least a portion of the pressure swing adsorption unit by-product gas (82), the process further comprising:
passing a second portion of the second water stream (230) from the heat exchanger (235) for heating the second water stream (230) to a heat exchanger 515 for heating the pressure swing adsorption unit by-product gas (82), and heating the pressure swing adsorption unit by-product gas (82) by indirect heat transfer with the second portion of the second water stream (230) prior to the at least a portion of the pressure swing adsorption unit by-product gas (82) being combusted as the fuel (82, 35).

Aspect 9. The process of aspect 6 or aspect 8 wherein the second portion of the imported water stream (410) as part of the second water stream (230), bypasses any and all of the first plurality of heat exchangers and any and all of the second plurality of heat exchangers on its initial pass to the heat exchanger (235) for heating the second water stream (230).

Aspect 10. The process of any one of aspects 6, 8, or 9 wherein the second portion of the imported water stream (410) passes to a deaerator (781) as part of the imported water stream (410) prior to the second portion of the of the imported water stream (410) being passed to the heat exchanger (235) for heating the second water stream (230).

Aspect 11. The process of any one of aspects 6, 8, 9, or 10 further comprising:
passing a third water stream (220) comprising a third portion of the imported water stream (410) to a first heat exchanger (314) of the first plurality of heat exchangers, and heating the third water stream (220) by indirect heat transfer with the reformate (25); and
passing the third water stream (220) from the first heat exchanger of the first plurality of heat exchangers to a steam drum (782).

Aspect 12. The process of aspect 11 wherein the third portion of the imported water stream (410) as part of the third water stream (220), bypasses any and all of the second plurality of heat exchangers on its initial pass to the first heat exchanger (314) of the first plurality of heat exchangers.

Aspect 13. The process of any one of aspects 3 to 12 further comprising
introducing a second imported water stream (makeup water) (400) into at least one heat exchanger (317, 323) of the second plurality of heat exchangers, and heating the second imported water stream (400) by indirect heat transfer with the reformate.

Aspect 14. The process of aspect 13 further comprising:
passing the second imported water stream (400) from the at least one heat exchanger (317, 323) of the second plurality of heat exchangers to a/the deaerator (781).

Aspect 15. The process of any one of the preceding aspects further comprising:
passing the water condensate (240) from the condensate separator (321) to a heat exchanger (316) of the second plurality of heat exchangers, and heating the water condensate (240) by indirect heat transfer with the reformate (25);
passing the water condensate (240) from the heat exchanger (316) of the second plurality of heat exchangers to a deaerator (711) for degassing condensate;

passing water condensate (245) from the deaerator (711) for degassing condensate to at least one heat exchanger (313, 315) of the first plurality of heat exchangers, and heating the water condensate (245) from the deaerator (711) by indirect heat transfer with the reformate (25) in the at least one heat exchanger (313, 315) of the first plurality of heat exchangers; and passing the water condensate (245) from the at least one heat exchanger (313, 315) of the first plurality of heat exchangers to a steam drum (712) for making steam from the water condensate (245).

Aspect 16. The process of any one of the preceding aspects wherein no portion of the steam stream (604) is used to heat the oxidant gas (99).

BRIEF DESCRIPTION OF SEVERAL VIEWS OF THE DRAWINGS

The sole FIGURE is a process flow diagram for a hydrogen production process according to the present process.

DETAILED DESCRIPTION OF THE PREFERRED EMBODIMENTS

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention, it being understood that various changes may be made in the function and arrangement of elements without departing from scope of the invention as defined by the claims.

The articles "a" and "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

The term "and/or" placed between a first entity and a second entity includes any of the meanings of (1) only the first entity, (2) only the second entity, and (3) the first entity and the second entity. The term "and/or" placed between the last two entities of a list of 3 or more entities means at least one of the entities in the list including any specific combination of entities in this list. For example, "A, B and/or C" has the same meaning as "A and/or B and/or C" and comprises the following combinations of A, B and C: (1) only A, (2) only B, (3) only C, (4) A and B and not C, (5) A and C and not B, (6) B and C and not A, and (7) A and B and C.

The phrase "at least one of" preceding a list of features or entities means one or more of the features or entities in the list of entities, but not necessarily including at least one of each and every entity specifically listed within the list of entities and not excluding any combinations of entities in the list of entities. For example, "at least one of A, B, or C" (or equivalently "at least one of A, B, and C" or equivalently "at least one of A, B, and/or C") has the same meaning as "A and/or B and/or C" and comprises the following combinations of A, B and C: (1) only A, (2) only B, (3) only C, (4) A and B and not C, (5) A and C and not B, (6) B and C and not A, and (7) A and B and C.

The term "plurality" means "two or more than two."

The phrase "at least a portion" means "a portion or all." The at least a portion of a stream may have the same composition with the same concentration of each of the species as the stream from which it is derived. The at least a portion of a stream may have a different concentration of species than that of the stream from which it is derived. The at least a portion of a stream may include only specific species of the stream from which it is derived.

As used herein a "divided portion" of a stream is a portion having the same chemical composition and species concentrations as the stream from which it was taken.

As used herein a "separated portion" of a stream is a portion having a different chemical composition and different species concentrations than the stream from which it was taken.

As used herein, "first," "second," "third," etc. are used to distinguish from among a plurality of steps and/or features, and is not indicative of the total number, or relative position in time and/or space unless expressly stated as such.

The term "depleted" means having a lesser mole % concentration of the indicated component than the original stream from which it was formed. "Depleted" does not mean that the stream is completely lacking the indicated component.

The terms "rich" or "enriched" means having a greater mole % concentration of the indicated component than the original stream from which it was formed.

As used herein, "heat" and "heating" may include both sensible and latent heat and heating.

As used herein, "indirect heat transfer" is heat transfer from one stream to another stream where the streams are not mixed together. Indirect heat transfer includes, for example, transfer of heat from a first fluid to a second fluid in a heat exchanger where the fluids are separated by plates or tubes. Indirect heat transfer includes transfer of heat from a first fluid to a second fluid where an intermediate working fluid is used to carry the heat from the first fluid to the second fluid. The first fluid may evaporate a working fluid, e.g. water to steam, in an evaporator, the working fluid passed to another heat exchanger or condenser, where the working fluid transfers heat to the second fluid. Indirect heat transfer from the first fluid to a second fluid using a working fluid may be accommodated using a heat pipe, thermosyphon, kettle boiler, or the like.

As used herein, "direct heat transfer" is heat transfer from one stream to another stream where the streams are intimately mixed together. Direct heat transfer includes, for example, humidification where water is sprayed directly into a hot air stream and the heat from the air evaporates the water.

Illustrative embodiments of the invention are described below. While the invention is susceptible to various modifications and alternative forms, specific embodiments thereof have been shown by way of example in the drawings and are herein described in detail. It should be understood, however that the description herein of specific embodiments is not intended to limit the invention to the particular forms disclosed, but on the contrary, the invention is to cover all modifications, equivalents, and alternatives falling within the scope of the invention as defined by the appended claims.

For the purposes of simplicity and clarity, detailed descriptions of well-known devices, circuits, and methods are omitted so as not to obscure the description of the present invention with unnecessary detail.

The present invention relates to a process for producing a hydrogen-containing product gas. The hydrogen-containing product gas may be industrial grade hydrogen. The hydrogen-containing product gas may be at least 96 volume % hydrogen or at least 99 volume % hydrogen.

The process utilizes catalytic steam-hydrocarbon reforming. Catalytic steam-hydrocarbon reforming, also called steam methane reforming (SMR), catalytic steam reforming, or steam reforming, is defined as any process used to convert reformer feedstock into reformate by reaction with steam over a catalyst. Reformate, also called synthesis gas, or simply syngas, as used herein is any mixture comprising hydrogen and carbon monoxide. The reforming reaction is an endothermic reaction and may be described generally as $C_nH_m + n\ H_2O \rightarrow n\ CO + (m/2+n)\ H_2$. Hydrogen is generated when reformate is generated.

The process is described with reference to the FIGURE showing a process flow diagram.

A process flow diagram for a catalytic steam-hydrocarbon reforming process suitable for carrying out the present process is shown in the FIGURE.

The process comprises introducing a reformer feed gas mixture 15 into a plurality of catalyst-containing reformer tubes 202 in a reformer furnace 201, reacting the reformer feed gas mixture 15 in a reforming reaction under reaction conditions effective to form a reformate 25 comprising $H_2$, CO, $CH_4$, and $H_2O$, and withdrawing the reformate 25 from the plurality of catalyst-containing tubes 202.

The reformer feed gas mixture 15 may be any feed gas mixture suitable for introducing into a catalytic steam-hydrocarbon reformer for forming a reformate. The reformer feed gas mixture 15 comprises at least one hydrocarbon and steam. The at least one hydrocarbon may be methane. The reformer feed gas mixture 15 is formed from a reformer feed 75 and steam. The reformer feed may be desulphurized in a hydrodesulphurization unit 300 with hydrogen 106 added for hydrodesulphurization. Hydrogen 106 may be provided from the hydrogen-containing product gas 30. The reformer feed gas mixture may be prereformed; formed by reacting the reformer feed 75 and steam 151 in a prereformer 141. The reformer feed 75 may be formed from a hydrocarbon feed 61, which may be natural gas, methane, naphtha, propane, refinery fuel gas, refinery off-gas, other suitable hydrocarbon feed known in the art, or combinations thereof.

The reforming reaction takes place inside the plurality of catalyst-containing reformer tubes 202 in reformer furnace 201. A reformer furnace, also called a catalytic steam reformer, steam methane reformer, and steam-hydrocarbon reformer, is defined herein as any fired furnace used to convert feedstock containing elemental hydrogen and carbon into reformate by a reaction with steam over a catalyst with heat provided by combustion of a fuel.

Reformer furnaces with a plurality of catalyst-containing reformer tubes, i.e. tubular reformers, are well-known in the art. Any suitable number of catalyst-containing reformer tubes may be used. Suitable materials and methods of construction are known. Catalyst in the catalyst-containing reformer tubes may be any suitable catalyst known in the art, for example, a supported catalyst comprising nickel.

The reaction conditions effective to form the reformate 25 in the plurality of catalyst-containing reformer tubes 202 may comprise a temperature ranging from 500° C. to 1000° C. and a pressure ranging from 203 kPa to 5,066 kPa (absolute). The reaction condition temperature may be as measured by any suitable temperature sensor, for example a type J thermocouple. The reaction condition pressure may be as measured by any suitable pressure sensor known in the art, for example a pressure gauge as available from Mensor.

The process comprises combusting a fuel 82, 35 with an oxidant gas 99 in a combustion section 203 of the reformer furnace 201 external to the plurality of catalyst-containing reformer tubes 202. The fuel is combusted under conditions effective to combust the fuel to form a combustion product gas 100 comprising $CO_2$ and $H_2O$ and generate heat to supply energy for reacting the reformer feed gas mixture 15 inside the plurality of catalyst-containing reformer tubes 202. The combustion product gas 100 is then withdrawn from the combustion section 203 of the reformer furnace 201.

Any suitable burner may be used to introduce the fuel 82, 35 and the oxidant gas 99 into the combustion section 203. Combustion of the fuel 82, 35 with the oxidant gas 99 generates heat to supply energy for reacting the reformer feed gas mixture 15 inside the plurality of catalyst-containing reformer tubes 202. The combustion product gas 100 is withdrawn from the combustion section 203 of the reformer furnace 201 and passed to the convection section 204 of the reformer furnace 201 to supply heat to other process streams. The combustion section (also called the radiant, radiation, or radiative section) of the reformer furnace is that part of the reformer furnace containing the plurality of catalyst-containing reformer tubes 202. The convection section of the reformer furnace is that part of the reformer furnace containing heat exchangers other than the plurality of catalyst-containing reformer tubes. The heat exchangers in the convection section may be for heating process fluids other than reformate from the plurality of catalyst-containing reformer tubes, such as water/steam, air, pressure swing adsorption unit by-product gas, reformer feed gas mixture prior to introduction into the catalyst-containing reformer tubes, prereformed reformer feed gas, etc. The convention section may also, if desired, contain a convective prereformer.

Furnace conditions effective to combust the fuel may comprise a furnace temperature ranging from 600° C. to 1500° C. and a pressure ranging from 98 kPa to 101.4 kPa (absolute). Actual flame temperatures are generally higher. The temperature may be as measured by a thermocouple, an optical pyrometer, or any other calibrated temperature measurement device known in the art for measuring furnace temperatures. The pressure may be as measured by any suitable pressure sensor known in the art, for example a pressure gauge as available from Mensor.

The fuel 82, 35 may be formed from a by-product gas 82 from a pressure swing adsorption unit 501 and a supplemental fuel 35. By-product gas from a pressure swing adsorption unit is often called pressure swing adsorber tail gas, and supplemental fuel is often called trim fuel. The by-product gas 82 and supplemental fuel 35 may be heated before being used as fuel. By-product gas 82 and supplemental fuel 35 may be blended and introduced together through a burner to the combustion section 203, or they may be introduced separately through different ports in the burner. Alternatively, the by-product gas 82 may be introduced through the primary burner and the supplemental fuel 35 may be introduced through lances near the burner.

The oxidant gas 99 is a gas containing oxygen and may be air, oxygen-enriched air, oxygen-depleted air such as gas turbine exhaust, industrial grade oxygen, or any other oxygen-containing gas known for use in a reformer furnace for combustion. For example, as shown in the FIGURE, air 90 may be compressed in forced draft fan 212, heated by at least a portion of water stream 230 in heat exchanger 214, and passed to the reformer furnace 201 as oxidant gas 99.

Combustion product gas 100 may heat a number of different process streams in the convection section 204 of the reformer furnace 201. The combustion product gas 100 may heat the streams in various different configurations (order of heating).

The FIGURE shows the combustion product gas 100 heating the reformer feed gas mixture 15, followed by heating the prereformer feed gas. After heating the prereformer feed gas, the combustion product gas superheats steam stream 125 from steam drum 782. A portion of the superheated steam may be used to form the reformer feed gas mixture 15 and another portion used to form a steam product 150 (i.e. export steam). After heating the steam, the combustion product gas then heats a portion of boiler feed water stream 129 from steam drum 712 in a heat exchanger to form a two-phase mixture of steam and water of which at least a portion is returned to the steam drum 712. Steam from steam drum 712 may be used to form the reformer feed gas mixture 15. The combustion product gas then heats a water stream 230 which is used to heat the combustion oxidant 99. The combustion product gas 100 may then be passed to an induced draft fan 211 and exhausted.

The process further comprises passing the reformate 25 from the plurality of catalyst-containing reformer tubes 202 to a shift reactor 301. The reformate 25 may exchange heat with a number of streams before being passed to the shift reactor 301. For example, the reformate 25 withdrawn from the plurality of catalyst-containing reformer tubes 202 may be passed to heat exchanger 40 (a so-called waste heat boiler) where the reformate 25 heats a portion of boiler feed water stream 127 thereby forming a two-phase water and steam stream that is reintroduced into steam drum 782.

In the shift reactor 301, the reformate 25 is reacted in the presence of a shift catalyst under reaction conditions sufficient to shift the reformate 25 to form additional $H_2$ in the reformate 25. Additional hydrogen gas may be obtained by the catalytic reaction of carbon monoxide and steam. This reaction is exothermic and is commonly referred to as the water-gas shift reaction or shift reaction: $CO+H_2O \rightarrow CO_2+H_2$. The reaction is affected by passing carbon monoxide and water through a bed of a suitable catalyst. The reaction conditions effective to form additional hydrogen in the reformate 25 may comprise a second temperature ranging from 190° C. to 500° C. and a second pressure ranging from 203 kPa to 5,066 kPa (absolute).

Any suitable shift catalyst may be used. The shift reactor may be a so-called high temperature shift (HTS), low temperature shift (LTS), medium temperature shift (MTS), or combination. One or more shift reactors may be used.

For high temperature shift, an inlet temperature in the range 310° C. to 370° C., and an outlet temperature in the range 400° C. to 500° C. are typical. Usually an iron oxide/chromia catalyst is used for high temperature shift. High temperature shift may be preferred for the present process.

For low temperature shift, an inlet temperature in the range 190° C. to 230° C., and an outlet temperature in the range 220° C. to 250° C. are typical. Usually a catalyst comprising metallic copper, zinc oxide, and one or more other difficulty reducible oxides such as alumina or chromia is used for low temperature shift For medium temperature shift, an inlet temperature in the range 190° C. to 230° C. and an outlet temperature of up to 350° C. are typical. A suitably formulated supported copper catalyst can be used for medium temperature shift.

A combination may include a sequence of high temperature shift, cooling by indirect heat exchange, and low temperature shift. If desired, either shift stage can be subdivided with interbed cooling.

The process comprises passing the reformate 25 from the shift reactor 301 to a steam generator 318 via a first plurality of heat exchangers 311, 312, 313, 314, 315. The first plurality of heat exchangers operatively connect the shift reactor 301 to the steam generator 318, thereby cooling the reformate in the first plurality of heat exchangers 311, 312, 313, 314, 315.

Various streams may be heated by the reformate 25 in the first plurality of heat exchangers 311, 312, 313, 314, 315. For example, as shown in the FIGURE, a reformer feed 75 may be heated by indirect heat transfer with the reformate 25 in heat exchanger 311 and heat exchanger 312. Condensate from deaerator 711 may be heated by indirect heat transfer with the reformate in heat exchanger 313 and heat exchanger 315.

The process comprises heating a first water stream 601 by indirect heat transfer with the reformate 25 in the steam generator 318 to produce a low pressure steam stream 604 from the first water stream 601. The low pressure steam stream 604 may have an absolute pressure ranging from about 115 kPa (16.7 psia) to about 689.5 kPa (100 psia), or ranging from about 115 kPa (16.7 psia) to about 583.8 kPa (84.7 psia), or ranging from about 138 kPa (20 psia) to about 689.5 kPa (100 psia), or ranging from about 138 kPa (20 psia) to about 583.8 kPa (84.7 psia).

The steam generator 318 may be any suitable device for making steam, for example, a kettle boiler and the like.

The process comprises passing a first portion 610 or all of the steam stream 604 to a heat exchanger 133 and heating hydrocarbon feed 61 by indirect heat transfer with the first portion 610 or all of the steam stream 604. The steam stream 604 may be condensed or partially condensed in heat exchanger 133 and the resulting stream may be passed to deaerator 781 as a boiler feed water return stream.

Heating the hydrocarbon feed 61 with the first portion 610 or all of the steam stream 604 improves plant net energy efficiency during cold ambient conditions. By heating the cold feed with steam produced by low level heat recovery, the boiler feed water preheat exchangers in the first plurality of exchangers recover more higher level heat resulting in higher export steam flow.

Heating the hydrocarbon feed 61 with the first portion 610 or all of the steam stream 604 also helps solve the problem of hydrate formation in the supplemental fuel 35, when it is formed from the hydrocarbon feed 61. When the supplemental fuel 35 is throttled across a valve or other orifice to pressures used at the burner, the supplemental fuel, already cold due to the cold climate, is further cooled via the Joule-Thomson (JT) effect. This causes higher hydrocarbons such as propane and butane to form solid hydrates with water in the stream. These hydrates are unstable compounds that clog the fuel lines and valves. Heating the hydrocarbon feed 61 also helps reduce sulfur deposition in the reformer feed lines feeding the hydrodesulphurization unit 300.

A second portion of the steam stream 604 may be passed to deaerator 781 to assist with degassing water streams introduced into deaerator 781.

A third portion of the steam stream 604 may be passed to deaerator 711 to assist with degassing water streams introduced into deaerator 711.

As used herein a deaerator is any device that removes dissolved gases from water with the assistance of steam. The steam may be introduced or formed in-situ. The manufacture and operation of deaerators are well-known.

It is notable that that in the present process, no portion of the low pressure steam stream 604 is used to heat oxidant gas for combustion. Difficulties may arise when low pressure steam and low pressure combustion air exchange heat. In theory, the same net efficiency could be achieved at a facility that uses low pressure steam for air preheating as a facility that uses low pressure steam for heating the hydrocarbon feed. In practice, however, the use of a large, expensive, and complicated heat exchanger is needed due to the low heat transfer coefficient of the low pressure combustion air and the resistance to heat transfer that results from condensing low pressure steam. US2011/0977962 provides an example of a process where low pressure steam is used to heat oxidant gas for combustion.

The process comprises forming the reformer feed gas mixture 15 from a reformer feed 75, wherein the reformer feed 75 comprises at least a portion of the hydrocarbon feed 61 that was heated in the heat exchanger 133 for heating the hydrocarbon feed.

The process may comprise dividing the hydrocarbon feed 61 after heating the hydrocarbon feed 61 in the heat exchanger 133 to form the reformer feed 75 and the supplemental fuel 35. The reformer feed 75 and the supplemental fuel 35 may be divided portions of the hydrocarbon feed 61.

The process comprises passing the reformate 25 from the steam generator 318 to a condensate separator 321 via a second plurality of heat exchangers 316, 317, 322, 323. The second plurality of heat exchangers operatively connect the steam generator 318 to the condensate separator 321. Water in the reformate is condensed to form a water condensate 240 and a water-depleted reformate 29. Water condensate 240 is separated from the water-depleted reformate 29 in the condensate separator 321. Condensate separator 321 may be any suitable vapor-liquid separator, for example, a so-called knock-out drum or knock-out pot.

Various streams may be heated by the reformate in the second plurality of heat exchangers. A boiler feed water stream comprising a return boiler feed water stream from stream 230 and makeup water 400 may be heated in heat exchanger 317. A water condensate stream 240 may be heated in heat exchanger 316.

The reformate may be further cooled in a fan-driven air cooler 322. Makeup water 400 may be heated by the reformate in heat exchanger 323. With hot makeup water 410 comprising a large portion of the total makeup water (400+410), the majority of the final cooling of the reformate is carried out in the air cooler 322. By increasing the heat duty of heat exchanger 318 to produce low pressure steam stream 610, the air cooler 322 heat duty is reduced, resulting in a less capital-intensive and therefore more cost-effective cooling train. Hot makeup water 410 may be 40 mass % to 80 mass % of the total makeup water provided to the process.

The process comprises forming the hydrogen-containing product gas 30 from at least a portion of the water-depleted reformate 29.

The hydrogen-containing product gas 30 may be formed from at least a portion of the water-depleted reformate 29 in a pressure swing adsorption unit 501. A pressure swing adsorption unit feed comprising at least a portion of the water-depleted reformate may be separated in the pressure swing adsorption unit 501 to form the hydrogen-containing product gas 30 and a pressure swing adsorption unit by-product gas 82, also called PSA tail gas, and PSA purge gas. The fuel combusted in the combustion section of the reformer furnace 201 may be formed from at least a portion of the pressure swing adsorption unit by-product gas 82.

The pressure swing adsorption unit 501 may be operated using any known pressure swing adsorption cycle. Pressure swing adsorption cycles are well-known in the art and the various steps are described for example in U.S. Pat. Appl. Pub. No. 2014/0373713, incorporated herein by reference. Specific pressure swing adsorption cycles are provided in companion articles "Pressure Swing Adsorption cycles for 4 to 7 adsorption beds," IP.com number 000241449, Apr. 29, 2015, and "Pressure Swing Adsorption cycles for 7 or more adsorption beds," IP.com number 000241619, May 18, 2015.

The process may comprise passing a first portion of an imported water stream 410 to the steam generator 318 as at least a portion of the first water stream 601. Due to freezing ambient conditions, the imported water stream has a temperature ranging from 60° C. to 130° C. or ranging from 80° C. to 130° C. to prevent the imported water stream 410 from freezing during cold winter months. The imported water stream 410 may have a pressure ranging from 308 kPa (30 psig) to 3548 kPa (500 psig) or ranging from 377 kPa (40 psig) to 1825 kPa (250 psig). The imported water stream 410 may be hot boiler feed water from another process near the site of the process for producing the hydrogen-containing product gas.

Since the imported water stream is hot, at least a portion of the imported water stream 410 bypasses any and all of the first plurality of heat exchangers 311, 312, 313, 314, 315 operatively connecting the shift reactor 301 to the steam generator 318 and any and all of the second plurality of heat exchangers 316, 317, 322, 323 operatively connecting the steam generator 318 to the condensate separator 321 on its initial pass to the steam generator 318.

The first portion of the imported water stream 410 which forms at least a portion of the first water stream 601 may bypass any and all of the first plurality of heat exchangers and any and all of the second plurality of heat exchangers on its initial pass to the steam generator 318.

The imported water stream 410, including the first portion of the imported water stream 410, may be passed to deaerator 781 prior to the first portion of the imported water stream 410 being passed to the steam generator 318 as part of the first water stream 601. The imported water stream 410 may be combined with various boiler feed water return streams in deaerator 781.

The first water stream 601 may also comprise other boiler feed water from deaerator 781 in addition to the first portion of the imported water stream 410.

Alternatively, the imported water stream 410, including the first portion of the imported water stream 410, may already be deaerated and bypass deaerator 781.

The process may further comprise passing a second water stream 230 comprising a second portion of the imported water stream 410 to a heat exchanger 235, and heating the second water stream 230 by indirect heat transfer with the combustion product gas 100 in heat exchanger 235. The heat exchanger 235 may be in the convection section 204 of the reformer furnace 201.

The second portion of the imported water stream 410 which forms at least a portion of the second water stream 230 may bypass any and all of the first plurality of heat exchangers and any and all of the second plurality of heat exchangers on its initial pass to the heat exchanger 235.

The second portion of the imported water stream 410 may be passed to deaerator 781 prior to the second portion of the imported water stream 410 being passed to heat exchanger 235 as part of the second water stream 230.

A first portion or all of the second water stream 230 may be passed from the heat exchanger 235 to a heat exchanger 214 to heat the oxidant gas 99 by indirect heat transfer with the first portion or all of the second water stream 230. The oxidant gas 99 is heated prior to the oxidant gas 99 being used to combust the fuel in the combustion section 203 of the reformer furnace 201.

The first portion or all of the second water stream 230 may be passed from heat exchanger 214 to heat exchanger 317 of the second plurality of heat exchangers to heat the first portion or all of the second water stream 230 by indirect heat transfer with the reformate 25. The first portion or all of the second water stream 230 may be passed from heat exchanger 317 to deaerator 781 as a boiler feed water return stream.

A second portion of the second water stream 230 may be passed from the heat exchanger 235 to a heat exchanger 515 to heat the pressure swing adsorption unit by-product gas 82 by indirect heat transfer with the second portion of the second water stream 230. The pressure swing adsorption unit by-product gas 82 may be heated prior to the pressure swing adsorption unit by-product gas 82 being combusted as fuel in the combustion section 203 of the reformer furnace 201.

Heating pressure swing adsorption unit by-product gas is known from U.S. Pat. No. 8,187,363, and also from earlier publications WO2007/020514A2, U.S. Pat. No. 7,377,951, and U.S. Pat. No. 7,850,944.

The second portion of the second water stream 230 may be combined with the first portion of the second water stream and passed to heat exchanger 317 to heat the first and second portions of the second water stream 230 by indirect heat transfer with the reformate 25. The first and second portions of the second water stream 230 may by passed from heat exchanger 317 to deaerator 781 as a boiler feed water return stream.

The process may further comprise passing a third water stream 220 comprising a third portion of the imported water stream 410 to a first heat exchanger 314 of the first plurality of heat exchangers and heating the third water stream 220 by indirect heat transfer with the reformate 25. The third water stream 220 may then be passed to steam drum 782 for making additional high pressure steam 125.

The third portion of the imported water stream 410 as part of the third water stream 220, may bypass any and all of the second plurality of heat exchangers on its initial pass to the first heat exchanger 314 of the first plurality of heat exchangers.

The process may further comprise introducing a second imported water stream (i.e. makeup water) 400 into at least one heat exchanger 317, 323 of the second plurality of heat exchangers and heating the second imported water stream 400 by indirect heat transfer with the reformate. The second imported water stream may be heated by indirect heat transfer with the reformate in heat exchanger 323 and then combined with returning second water stream 230. The combined stream may then be heated by indirect heat transfer with the reformate in heat exchanger 317 and passed from heat exchanger 317 to deaerator 781.

The second imported water stream may have a temperature ranging from 4° C. to 25° C. and a pressure ranging from 340 kPa to 1500 kPa just prior to introducing the second imported water stream 400 into heat exchanger 323. The second imported water stream may be formed from reverse osmosis or other suitable means. The second imported water stream may be in limited supply. The second imported water stream may be provided without the use of a cooling tower. In cold climates, it may be desired to avoid the use of cooling towers altogether due to water freezing concerns during cold winter months.

The process may further comprise passing the water condensate 240 from the condensate separator 321 to a heat exchanger 316 of the second plurality of heat exchangers, and heating the water condensate 240 by indirect heat transfer with the reformate 25. The water condensate may be passed from heat exchanger 316 to a deaerator 711 to degas the condensate. As discussed above, a portion of the steam stream 604 may be passed to deaerator 711 to assist with degassing water streams introduced into deaerator 711.

The dissolved gases, which may include methanol, are removed from deaerator 711 via vent stream 710. To reduce VOC emissions from the hydrogen production facility, the deaerator vent streams from deaerator 711 and/or deaerator 781 may be injected into the reformer furnace 201 as described in the "Report on Emission Limits for Rule 1189—Emissions from Hydrogen Plant Process Vents," South Coast Air Quality Management District, Jun. 7, 2001 (http//www3.aqmd.gov/hb/attachments/2002/020620b.doc), and "Final Environmental Assessment: Proposed Rule 1189—Emissions from Hydrogen Plant Process Vents" SCAQMD No. 1189JDN021199, South Coast Air Quality Management District Dec. 17, 1999 (http://www.aqmd.gov/docs/default-source/ceqa/documents/aqmd-projects/2000/final-ea-for-proposed-amended-rule-1189.doc?sfvrsn=4).

The water condensate 245 from deaerator 711 may be passed to heat exchanger 315 and heat exchanger 313 to be heated by indirect heat transfer with the reformate 25. The water condensate 245 may be passed from heat exchanger 313 to steam drum 712 to make steam from the water condensate 245.

The advantage of using a separate steam drum for the water condensate 245 and a separate steam drum for boiler feed water formed from the imported water streams 410 and 400, is to prevent the organic compounds from getting into the export steam 150. Steam formed from the water condensate may be used to form reformer feed gas mixture 15 where the presence of the organic compounds can be easily tolerated.

EXAMPLE

Aspen Plus® by Aspen Technology, Inc. was used to simulate the process with winter-type ambient conditions. Typical conditions for commercial catalytic steam-hydrocarbon reforming are used, such as natural gas feedstock, and steam-to-carbon ratio. The process is simulated for a case with prereformer 141 and high temperature shift reactor 301.

Hydrocarbon feed 61 having an initial temperature of 0° C. (32° F.) is heated by indirect heat transfer with low pressure steam 610 in heat exchanger 133 to a temperature of 115° C. (239° F.). The temperature of steam 610 entering heat exchanger 133 is about 134° C. (274° F.).

The hydrocarbon feed 61 is divided after being heated in heat exchanger 133 to form supplemental fuel 35 and reformer feed 75. Heating the hydrocarbon feed prevents the formation of hydrates in the supplemental fuel 35 prior to being introduced into the reformer furnace 201 and prevents sulfur deposition in the reformer feed 75 prior to the reformer feed being introduced into the hydrodesulphurization unit 300. Supplemental fuel 35 is passed to burners in the reformer furnace 201 for combustion with oxidant gas 99

(preheated air) external to the plurality of catalyst-containing reformer tubes 202. Reformer feed 75 is heated in heat exchangers 312 and 311 to a temperature of 371° C. (700° F.) by heat exchange with reformate 25. Reformate 25 is cooled in heat exchanger 311 and in heat exchanger 312.

Hydrogen 106 is added to reformer feed 75 and passed to hydrodesulphurization unit 300.

Steam 151 is added to the reformer feed 75 in a mixing tee to form mixed feed which is passed to a heat exchanger in the convection section 204 of the reformer furnace 201 where the mixed feed is heated.

The mixed feed is passed to prereformer 141 where the mixed feed is reacted and withdrawn at a lower temperature. The prereformed mixed feed is passed to a heat exchanger in the convection section 204 of the reformer furnace 201 where the prereformed mixed feed is heated to form the reformer feed gas mixture 15.

The reformer feed gas mixture 15 is introduced into the plurality of catalyst-containing reformer tubes 202 in the reformer furnace 201 where the reformer feed gas mixture 15 is reacted in a reforming reaction to form reformate 25 comprising $H_2$, $CO$, $CH_4$, and $H_2O$. Reformate 25 is withdrawn from the plurality of catalyst-containing tubes 202 and passed to waste heat boiler 40 to make water to make steam. The reformate 25 is cooled to in waste heat boiler 40 and subsequently passed to shift reactor 301. The shifted reformate 25 is passed through and cooled in a series of heat exchangers 311, 313, 314, 312, 315, 318, 317, 316, 322 and 323. Water in the reformate is condensed and the two-phase mixture separated in condensate separator 321.

Water condensate 240 from the condensate separator 321 is pumped and heated in heat exchanger 316 to a temperature of 103° C. (217° F.) and passed to deaerator 711 while water-depleted reformate 29 is passed to pressure swing adsorption unit 501.

Steam is introduced into deaerator 711 and dissolved gas are removed from the water condensate 240 in deaerator 711 via vent stream 710. Water condensate 245 from deaerator 711 is pumped and passed to heat exchangers 315 and 313 where it is heated by indirect heat exchange with reformate 25 to a temperature of 242° C. (467° F.). After being heated in heat exchangers 315 and 313, water condensate 245 is passed to steam drum 712 to make steam from the water condensate 245. Boiler feed water stream 129 from steam drum 712 is passed to a heat exchanger in the convection section of the reformer furnace 201 to form a two-phase mixture of steam and water which is returned to the steam drum 712. Steam 151, which is used to form the mixed feed, comprises all of the steam made from water condensate 245.

Water-depleted reformate 29 is separated in pressure swing adsorption unit 501 to form hydrogen-containing product gas 30 and a pressure swing adsorption unit by-product gas 82. Pressure swing adsorption unit by-product gas 82 is heated by indirect heat transfer with boiler feed water in heat exchanger 515 and passed to burners in the reformer furnace 201 as fuel for combustion with oxidant gas (preheated air) 99 external to the plurality of catalyst-containing reformer tubes 202.

Combustion product gas 100 formed from combustion of pressure swing adsorption unit by-product gas 82 and supplemental fuel 35 is used to heat various process streams in the convection section 204 of the reformer furnace 201.

Air 90 is compressed in forced draft fan 212 and heated by indirect heat exchange with boiler feed water from deaerator 781, water stream 230 in heat exchanger 214 to a temperature of 187° C. (369° F.) thereby forming preheated oxidant gas 99.

In order to avoid freezing of the primary makeup water stream, imported water stream 410 having a temperature of 117° C. (243° F.) is passed to deaerator 781. A secondary makeup water stream, imported water stream 400 having a temperature of 10° C. (50° F.), is heated by indirect heat exchange with reformate 25 in heat exchangers 323 and 317 and passed to deaerator 781. The mass flow rate of the primary makeup water stream 410 is about 60% of the total makeup water provided.

Boiler feed water from deaerator 781 is divided into a first portion, water stream 601, which is passed to steam generator 318, a second portion, water stream 220, which is passed to heat exchanger 314, and a third portion, water stream 230, which is passed to heat exchanger 235.

Water stream 601 is heated in steam generator 318 to form a low pressure steam stream 604 having a temperature of 134° C. (274° F.). A portion 610 of the low pressure steam stream 604 is passed to heat exchanger 133 to heat the incoming hydrocarbon feed 61, another portion is used as stripping steam in deaerator 711, and another portion 11 is used as stripping steam in deaerator 781. The low pressure steam condenses in the heat exchanger 133 and is passed to deaerator 781.

Water stream 220 is heated in heat exchanger 314 by indirect heat transfer with reformate 25 and passed to steam drum 782. Boiler feed water stream 127 from steam drum 782 is passed to a heat exchanger (waste heat boiler) 40 to form a two-phase mixture of steam and water which is returned to the steam drum 712 to make steam.

High pressure steam 125 is withdrawn from steam drum 782 and passed to a heat exchanger in the convection section of the reformer furnace 201 to be superheated. A portion of the superheated steam is removed from the system as export steam 150 and another portion is used to form the mixed feed.

Water stream 230 is heated by indirect heat transfer with combustion product gas 100 in heat exchanger 235 in the convection section 204 of the reformer furnace 201 to a temperature of 214° C. (418° F.) and a pressure to maintain as a liquid stream. A portion of the heated water stream 230 is passed to heat exchanger 214 to preheat the combustion air 90. Another portion is further heated in a heat exchanger (not shown) in the convection section 204 of the reformer furnace 201 to a temperature of 268° C. (514° F.) and subsequently passed to heat exchanger 515 to preheat pressure swing adsorption unit by-product gas 82. The portion of the water stream 230 that heats combustion air and the portion of the water stream 230 that heats the pressure swing adsorption unit by-product gas 82 are recombined and passed to heat exchanger 317 where it is heated by indirect heat transfer with reformate 25 and then passed to deaerator 781.

The thermal energy consumption for hydrogen production for various processes can be compared using the net specific energy (NSE) having units $J/Nm^3$, which can be defined $$NSE = \frac{HHV_{fuel} * F_{fuel} + HHV_{feed} * F_{feed} - \Delta H * F_{steam}}{HPR},$$

where
$HHV_{fuel}$ is the higher heating value of the supplemental fuel introduced into the combustion section ($J/Nm^3$),
$F_{fuel}$ is the flow rate of the fuel ($Nm^3/h$),
$HHV_{feed}$ is the higher heating value of the reformer feedstock introduced into the reformer ($J/Nm^3$), $F_{feed}$ is the flow rate of the reformer feedstock (Nm³/h),
ΔH is the enthalpy difference between the export steam and water at 25° C. (J/kg),
$F_{steam}$ is the mass flow of the export steam (kg/h), and
HPR is the hydrogen production rate (Nm³/h).

The net specific energy for the present process is slightly less than comparable processes that are not suitable for cold climate operation. However the present process provides the benefits avoiding freezing of any process water streams, avoiding solid deposits in hydrocarbon streams due to hydrate formation and/or sulfur deposition, and reducing the required size of forced draft air coolers such as, for example, air cooler 322, to cool the reformate when cold makeup water is in short supply.

We claim:

1. A process for producing a hydrogen-containing product gas, the process comprising:

introducing a reformer feed gas mixture comprising at least one hydrocarbon and steam into a plurality of catalyst-containing reformer tubes in a reformer furnace, reacting the reformer feed gas mixture in a reforming reaction under reaction conditions effective to form a reformate comprising $H_2$, CO, $CH_4$, and $H_2O$, and withdrawing the reformate from the plurality of catalyst-containing tubes;

combusting a fuel with an oxidant gas in a combustion section of the reformer furnace external to the plurality of catalyst-containing reformer tubes under conditions effective to combust the fuel to form a combustion product gas and generate heat to supply energy for reacting the reformer feed gas mixture inside the plurality of catalyst-containing reformer tubes, and withdrawing the combustion product gas from the combustion section;

passing the reformate from the plurality of catalyst-containing reformer tubes to a shift reactor and reacting the reformate in the presence of a shift catalyst under reaction conditions sufficient to shift the reformate to form additional $H_2$ in the reformate;

passing the reformate from the shift reactor to a steam generator via a first plurality of heat exchangers, the first plurality of heat exchangers operatively connecting the shift reactor to the steam generator, thereby cooling the reformate in the first plurality of heat exchangers;

heating a first water stream by indirect heat transfer with the reformate in the steam generator to produce a steam stream from the first water stream;

passing a first portion or all of the steam stream to a heat exchanger for heating a hydrocarbon feed and heating the hydrocarbon feed by indirect heat transfer with the first portion or all of the steam stream;

forming the reformer feed gas mixture from a reformer feed, wherein the reformer feed comprises at least a portion of the hydrocarbon feed that was heated in the heat exchanger for heating the hydrocarbon feed;

passing the reformate from the steam generator to a condensate separator via a second plurality of heat exchangers, the second plurality of heat exchangers operatively connecting the steam generator to the condensate separator, thereby condensing water in the reformate to form a water condensate and a water-depleted reformate, and separating the water condensate from the water-depleted reformate in the condensate separator; and forming the hydrogen-containing product gas from at least a portion of the water-depleted reformate.

2. The process of claim 1 further comprising:

dividing the hydrocarbon feed after heating the hydrocarbon feed in the heat exchanger for heating the hydrocarbon feed to form the reformer feed and a supplemental fuel, wherein the fuel comprises the supplemental fuel.

3. The process of claim 1 further comprising:

passing a first portion of an imported water stream to the steam generator as at least a portion of the first water stream, the imported water stream having a temperature ranging from 60° C. to 120° C. wherein at least a portion of the imported water stream bypasses any and all of the first plurality of heat exchangers operatively connecting the shift reactor to the steam generator and any and all of the second plurality of heat exchangers operatively connecting the steam generator to the condensate separator on its initial pass to the steam generator, where the first plurality of heat exchangers include each and every heat exchanger operatively connecting the shift reactor to the steam generator, and where the second plurality of heat exchangers include each and every heat exchanger operatively connecting the steam generator to the condensate separator.

4. The process of claim 3 wherein the first portion of the imported water stream bypasses any and all of the first plurality of heat exchangers and any and all of the second plurality of heat exchangers on its initial pass to the steam generator.

5. The process of claim 3 wherein the first portion of the imported water stream passes to a deaerator as part of the imported water stream prior to the first portion of the imported water stream being passed to the steam generator.

6. The process of claim 3 further comprising:

passing a second water stream comprising a second portion of the imported water stream to a heat exchanger for heating the second water stream, and heating the second water stream by indirect heat transfer with the combustion product gas in the heat exchanger for heating the second water stream; and passing a first portion or all of the second water stream from the heat exchanger for heating the second water stream to a heat exchanger for heating the oxidant gas, and heating the oxidant gas by indirect heat transfer with the first portion or all of the second water stream prior to the oxidant gas being used to combust the fuel.

7. The process of claim 3 wherein the step of forming the hydrogen-containing product gas from the water-depleted reformate comprises separating a pressure swing adsorption unit feed comprising at least a portion of the water-depleted reformate gas in a pressure swing adsorption unit to form the hydrogen-containing product gas and a pressure swing adsorption unit by-product gas, wherein the fuel is formed from at least a portion of the pressure swing adsorption unit by-product gas.

8. The process of claim 6 wherein the step of forming the hydrogen-containing product gas from the water-depleted reformate comprises separating a pressure swing adsorption unit feed comprising at least a portion of the water-depleted reformate gas in a pressure swing adsorption unit to form the hydrogen-containing product gas and a pressure swing adsorption unit by-product gas, wherein the fuel is formed from at least a portion of the pressure swing adsorption unit by-product gas, the process further comprising:

passing a second portion of the second water stream from the heat exchanger for heating the second water stream to a heat exchanger for heating the pressure swing adsorption unit by-product gas, and heating the pressure swing adsorption unit by-product gas by indirect heat transfer with the second portion of the second water stream prior to the at least a portion of the pressure swing adsorption unit by-product gas being combusted as the fuel.

9. The process of claim 6 wherein the second portion of the imported water stream as part of the second water stream, bypasses any and all of the first plurality of heat exchangers and any and all of the second plurality of heat exchangers on its initial pass to the heat exchanger for heating the second water stream.

10. The process of claim 6 wherein the second portion of the imported water stream passes to a deaerator as part of the imported water stream prior to the second portion of the of the imported water stream being passed to the heat exchanger for heating the second water stream.

11. The process of claim 6 further comprising:
passing a third water stream comprising a third portion of the imported water stream to a first heat exchanger of the first plurality of heat exchangers, and heating the third water stream by indirect heat transfer with the reformate; and
passing the third water stream from the first heat exchanger of the first plurality of heat exchangers to a steam drum.

12. The process of claim 11 wherein the third portion of the imported water stream as part of the third water stream, bypasses any and all of the second plurality of heat exchangers on its initial pass to the first heat exchanger of the first plurality of heat exchangers.

13. The process of claim 3 further comprising
introducing a second imported water stream into at least one heat exchanger of the second plurality of heat exchangers, and heating the second imported water stream by indirect heat transfer with the reformate.

14. The process of claim 13 further comprising:
passing the second imported water stream from the at least one heat exchanger of the second plurality of heat exchangers to a/the deaerator.

15. The process of claim 1 further comprising:
passing the water condensate from the condensate separator to a heat exchanger of the second plurality of heat exchangers, and heating the water condensate by indirect heat transfer with the reformate;
passing the water condensate from the heat exchanger of the second plurality of heat exchangers to a deaerator for degassing condensate;
passing water condensate from the deaerator for degassing condensate to at least one heat exchanger of the first plurality of heat exchangers, and heating the water condensate from the deaerator by indirect heat transfer with the reformate in the at least one heat exchanger of the first plurality of heat exchangers; and
passing the water condensate from the at least one heat exchanger of the first plurality of heat exchangers to a steam drum for making steam from the water condensate.

16. The process claim 1 wherein no portion of the steam stream is used to heat the oxidant gas.

* * * * *